March 1, 1960
E. M. BOWEN
2,926,570
BORING MACHINE
Original Filed May 17, 1952
3 Sheets-Sheet 1
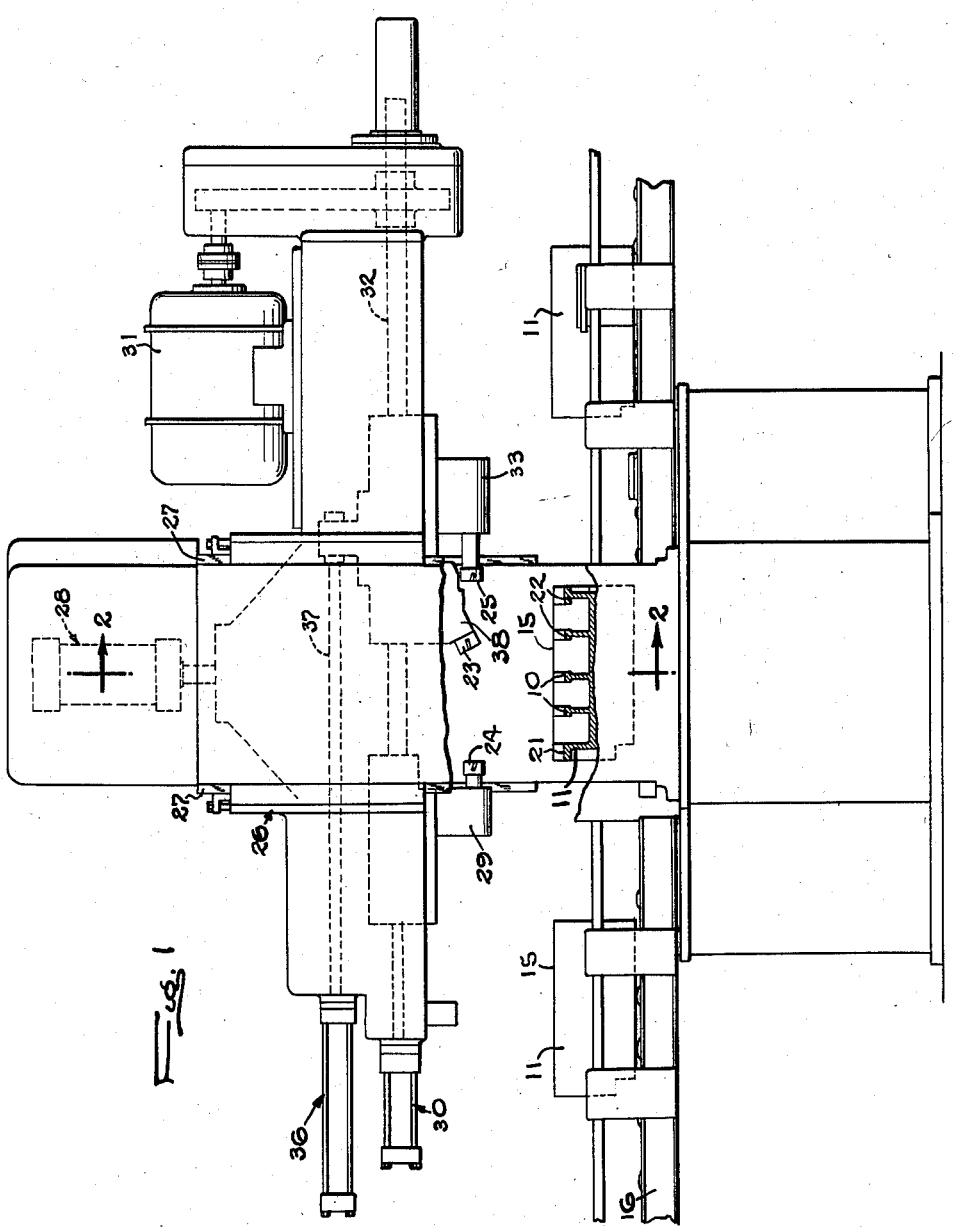

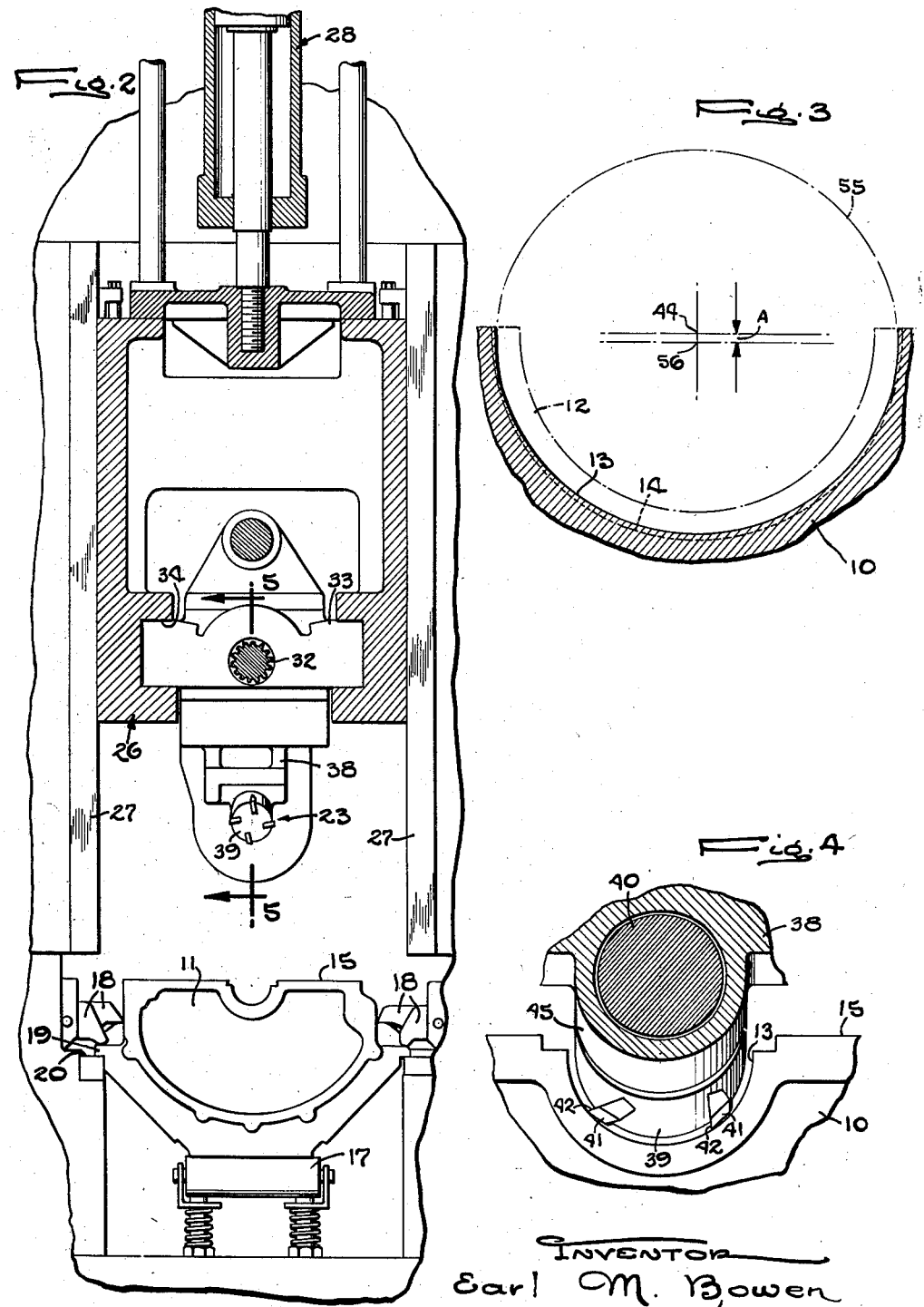

March 1, 1960 E. M. BOWEN 2,926,570
BORING MACHINE

Original Filed May 17, 1952 3 Sheets-Sheet 3

INVENTOR
Earl M. Bowen
By Carlsen, Pitzner, Hubbard & Wolfe
ATTORNEYS

United States Patent Office 2,926,570
Patented Mar. 1, 1960

2,926,570

BORING MACHINE

Earl M. Bowen, Rockford, Ill., assignor to The Ingersoll Milling Machine Company, Rockford, Ill., a corporation of Illinois Continuation of application Serial No. 288,465, May 17, 1952. This application November 7, 1955, Serial No. 545,206

1 Claim. (Cl. 90—18)

This invention relates to the boring of an arcuate recess in a workpiece through the use of a generally cylindrical milling type of cutter rotatable about an axis inclined relative to the axis of the bore but fed bodily along the latter axis.

The general object is to employ a cutter mounting of the above character in rough boring arcuate recesses at a rate substantially higher than has been possible heretofore.

The invention also resides in the novel mounting of the cutter to provide for removal of a layer of metal of substantially uniform thickness over the full area of the work surface so as to minimize the thickness of the metal required to be removed in a subsequent boring operation in order to form a cylindrical finished surface.

Other objects and advantages of the invention will become apparent from the following detailed description taken in connection with the accompanying drawings in which—

Figure 1 is a fragmentary front elevational view of a boring machine embodying the novel features of the present invention.

Fig. 2 is a fragmentary vertical sectional view taken along the line 2—2 of Fig. 1.

Fig. 3 is a fragmentary vertical sectional view of the rough bored workpiece.

Fig. 4 is a fragmentary sectional view taken along the line 4—4 of Fig. 5.

Figure 5:
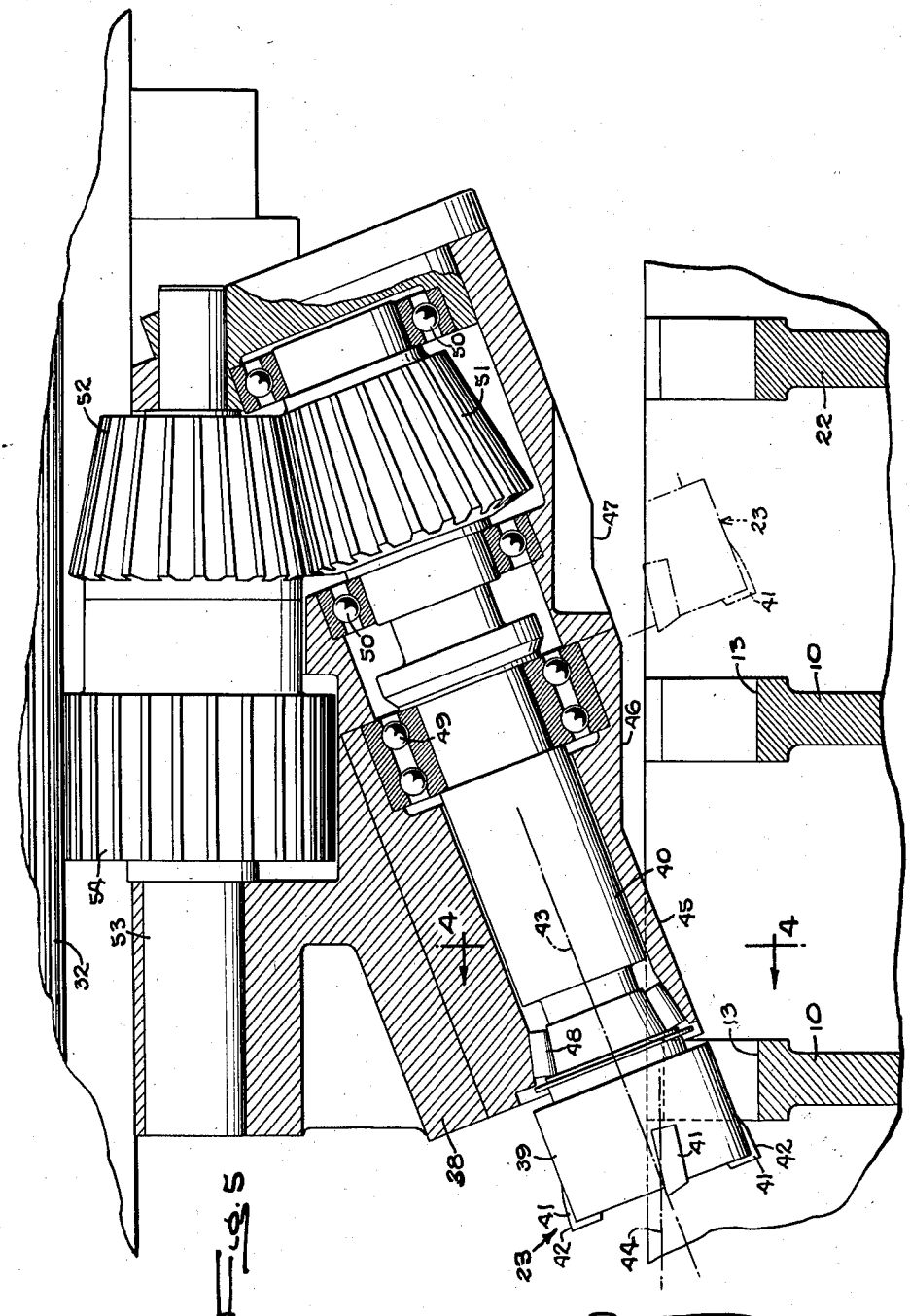
Fig. 5 is a fragmentary sectional view taken along the line 5—5 of Fig. 2.

In the drawings, the invention is shown incorporated in a machine for rough boring the intermediate webs 10 of an internal combustion engine block 11 to remove a relatively thick layer 12 of metal from an arcuate or semicylindrical surface 9 at the outer edge portion of each web and form thereon a generally semicylindrical surface 13 (Figs. 3 and 5) which is later finish bored to a truly cylindrical contour 14. Each workpiece to be bored is supported with the crankcase flange 15 facing upwardly and is slid along a conveyor 16 onto a horizontal support 17 (Fig. 2) within the machine where, by power actuated clamps 18, a flange 19 on the workpiece is pressed down against locating ledges 20.

The webs 10 and also the end webs 21 and 22 are machined by cutters 23, 24, and 25 mounted on a carriage 26 which slides vertically along ways 27 and is raised and lowered by a power actuator 28 to bring the cutter into operative position opposite the respective webs. The cutter 24 for boring the end web 21 is journaled on and projects from a head 29 slidable in horizontal ways on the carriage 26 and advanced and retracted by a hydraulic actuator 30. Power for rotating the cutter is derived from a motor 31 and transmitted through a horizontal spline shaft 32 journaled on the carriage 26.

In a similar way, the cutter 25 for boring the recesses in the two webs 22 at the other end of the casting is journaled on a head 33 slidable along horizontal ways 34 on the carriage and advanced and retracted by a hydraulic actuator 36 mounted on the carriage and connected to the head through a rod 37. Power take-offs from the shaft 32 drive the cutter 25 and also the cutter 23 which in the present instance is mounted on a housing 38 constituting an extension of the head 33 and overhanging one end portion of the casting to be bored.

The boring cutter 23 is of well known construction comprising a body 39 fast on the end of a spindle 40 and having angularly spaced teeth 41 which project from the outer periphery of the body and terminate in edges 42 defining a cylindrical peripheral cutting face which, as indicated in the drawings, has a radius larger than the contour of the rough bore surface 9 by the thickness of the metal layer 12 to be removed. The edges 42ª of the teeth 41 lie in a transaxial plane and define an end cutting face.

In accordance with the present invention, the spindle 40 is mounted in a novel manner in relation to the horizontal line of feed of the cutter along the axis 44 of the work bore so as to enable the spindle to be supported properly close to the cutter and to receive sufficient power from an external source to enable the webs 10 to be rough bored at extremely high speed. To this end, the spindle is journaled in the housing 38 with its axis 43 disposed in a vertical plane 57 bisecting the work recess and including the horizontal axis 44 of the work bore 13, the cutter axis being inclined upwardly and away from the cutter at an acute angle of sufficient magnitude to provide ample clearance throughout the boring operation between the lower portion of the spindle housing and the webs 10 to be bored.

The spindle projects through the tubular lower end portion of the housing 38 having a stepped bottom as indicated at 45, 46, and 47, the part 45 being rounded and shaped as shown in Fig. 4 to pass through the upper part of each recess 13 after rough boring thereof. The spindle is journaled in antifriction bearings 48, 49, and 50 disposed within the tubular part of the housing and quite widely spaced along the spindle, the bearing 48 being disposed close to the cutter 23 so as to provide an extremely rugged mounting.

Fast on the spindle between the bearings 50 is a bevel gear 51 which meshes with a gear 52 on a horizontal shaft 53 journaled in the housing 38 and carrying a spur gear 54 which meshes with elongated teeth on the spline shaft 32. The spindle bearings and the drive gearing being disposed upwardly beyond the exposed edges of the webs 10 may be of rugged construction and of the widths required to permit the transmission of the substantial amount of power required for removing the metal layer 12 at a high rate of feed of the cutter.

With the cutter mounted as described above, the head 38 is lowered in the plane 57 from the position shown in Figs. 1 and 2 to bring the cutter 23 to the initial operating position shown in phantom in Fig. 5, the cutter and the adjacent portion of the housing entering between one of the webs 10 and the adjacent web 22. From this position, the cutter is fed horizontally and to the left through the webs 10 from which the metal layers 12 are removed to form the recesses 13. In this movement of the cutter to the position shown in full in Fig. 5, that portion of the housing which is disposed below the upper edges of the webs 10 passes through the recesses 13 as indicated in Fig. 4.

In view of the inclination of the cutter axis relative to the direction of feed, it will be apparent that the projection of the cylindrical cutting face of the cutter onto a vertical plane is an ellipse 55 (Fig. 3) which is flattened slightly in a vertical direction thus locating the minor axis of the ellipse in the plane 57. The amount of such flattening is determined by the inclination of the cutter axis relative to the horizontal. Now, as the cutter is fed horizontally past each web, the metal layer 12 is removed and the work recess grooved to the contour 13 which is a reproduction of the lower half portion of the ellipse.

In removing the amount of metal required from the rough bored surface 13 to finish the bore to the truly cylindrical contour 14, it is desirable that the thickness of the metal layer removed in the rough boring operation be substantially uniform over the full circumferential length of the layer. To accomplish this, the invention contemplates offsetting the end face of the cutter from the center 44 of the rough bore so that the layer 12 removed at the bottom of the recess will not be materially greater than the thickness of metal cut from the ends of the arcuate work surface 9. For this purpose, the cutter is lowered to a position in which the point 56 of intersection of the cutter axis 43 with the plane of the end face 42ᵃ of the cutter is disposed below the axis 44 of the rough bore by an amount A (Fig. 3) which is just sufficient to compensate for the variation which would otherwise occur in the thickness of the metal layer 12 due to the flattened character of the ellipse 55. As a result, the layer of metal required to be removed by the finishing cutter to form the final cylindrical surface 14 is of substantially uniform thickness and comparatively thin.

In view of the rugged mounting of the cutter 25 as above described, the recesses in the intermediate webs 10 may be rough bored at as rapid a rate as the boring of the end webs by the cutters 24 and 25. The time consumed in rough boring all of the webs of a workpiece is thus reduced.

This application is a continuation of my copending application Serial No. 288,465, filed May 17, 1952, and now abandoned.

I claim as my invention:

A machine for rough boring a layer of metal from the full arcuate length of a semicylindrical work surface defining an outwardly opening recess in a workpiece, said machine having, in combination, a support for the workpiece, a tool support, means mounting said supports for relative movement along the axis of said semicylindrical work surface, a rotary spindle, a cylindrical boring cutter fast on one end of said spindle and having an axially and outwardly facing end cutting face of larger radius than the radius of curvature of said work surface by an amount substantially equal to the thickness of said metal layer, the axis of said spindle lying in a first plane including said work axis and being inclined at a substantial acute angle relative to the latter so as to incline said cutting face at an obtuse included angle relative to said work axis whereby the projection of said end cutting face on a perpendicular plane including said work surface is a semi-ellipse whose minor axis lies in said first plane, means on said tool support mounting said spindle for intersection of said semi-ellipse with the full arcuate length of said work surface and with the point of intersection between the spindle axis and said cutting face offset from said work axis in said first plane and toward the bottom of said recess whereby to space the intersection of said spindle and work axes behind said cutting face, and means for relatively feeding said tool and work supports along said work axis to carry the inclined cutting face through and across said recess and thereby remove said metal layer and reproduce the full contour of said semi-ellipse in said recess, said offset of said point of intersection being sufficient to compensate for the elliptical contour of said projection and thereby impart to the removed metal layer a thickness which is substantially uniform over the entire arcuate length of said work surface.

References Cited in the file of this patent

UNITED STATES PATENTS

| | | |
|---|---|---|
| 2,464,297 | Ertl | Mar. 15, 1949 |
| 2,645,162 | Granade et al. | July 14, 1953 |